US010965874B2

(12) United States Patent
McCauley et al.

(10) Patent No.: US 10,965,874 B2
(45) Date of Patent: Mar. 30, 2021

(54) ANALYTIC TRIGGERS

(71) Applicant: GoPro, Inc., San Mateo, CA (US)

(72) Inventors: Grant Adam McCauley, San Mateo, CA (US); Jason Short, Oakland, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/571,694

(22) Filed: Sep. 16, 2019

(65) Prior Publication Data

US 2020/0092492 A1 Mar. 19, 2020

Related U.S. Application Data

(60) Provisional application No. 62/732,792, filed on Sep. 18, 2018.

(51) Int. Cl.
*H04N 5/232* (2006.01)
*H04N 1/23* (2006.01)
*H04N 1/60* (2006.01)
*G06K 9/46* (2006.01)
*G06K 7/10* (2006.01)
*G06F 16/58* (2019.01)
*G06F 11/30* (2006.01)
*G06F 16/24* (2019.01)

(52) U.S. Cl.
CPC .............................. *H04N 5/232939* (2018.08)

(58) Field of Classification Search
CPC ......... H04N 5/232939; H04N 5/23222; H04N 5/232061; H04N 5/2356; H04N 1/00824; H04N 1/2392; H04N 1/6086; H04N 21/422; G06F 16/58; G06F 11/3072; G06F 16/24565; G06F 2203/04808; G06K 9/46; G06K 7/10405
USPC ............ 348/333.02, 316, 169; 382/100, 103, 382/172, 270; 345/214, 618; 707/214, 707/618
See application file for complete search history.

(56) References Cited

U.S. PATENT DOCUMENTS

| | | | |
|---|---|---|---|
| 7,197,158 B2 * | 3/2007 | Camara | G06K 9/00 382/100 |
| 9,143,677 B1 * | 9/2015 | Anon | H04N 5/23222 348/231.99 |
| 9,407,815 B2 * | 8/2016 | Bostick | H04N 5/23239 725/105 |
| 10,536,628 B2 * | 1/2020 | Liang | H04N 5/232 348/207.11 |
| 2006/0077461 A1 * | 4/2006 | Camara | G06F 3/12 358/1.15 |
| 2009/0278958 A1 * | 11/2009 | Bregman-Amitai | H04N 5/781 348/222.1 |

(Continued)

*Primary Examiner* — Marly S Camargo
(74) *Attorney, Agent, or Firm* — Young Basile Hanlon & MacFarlane, P.C.

(57) ABSTRACT

An image capture device may include an image sensor configured to capture an image and processing apparatus. The processing apparatus may be configured to obtain data and associate a function for each of the obtained data. The processing apparatus may be configured to store each function instance as analytic data. The processing apparatus may determine an analytic trigger occurrence and determine if the analytic trigger occurrence is greater than a function instance threshold. The processing apparatus may be configured to display a notification based on the analytic data.

20 Claims, 11 Drawing Sheets

(56) References Cited

U.S. PATENT DOCUMENTS

| | | | | |
|---|---|---|---|---|
| 2013/0038737 A1* | 2/2013 | Yehezkel | ............... | H04N 7/18 |
| | | | | 348/159 |
| 2016/0048369 A1* | 2/2016 | Zenoff | ............... | G06F 3/1454 |
| | | | | 715/734 |
| 2019/0174056 A1* | 6/2019 | Jung | ............... | H04N 5/23222 |
| | | | | 348/207.1 |

* cited by examiner

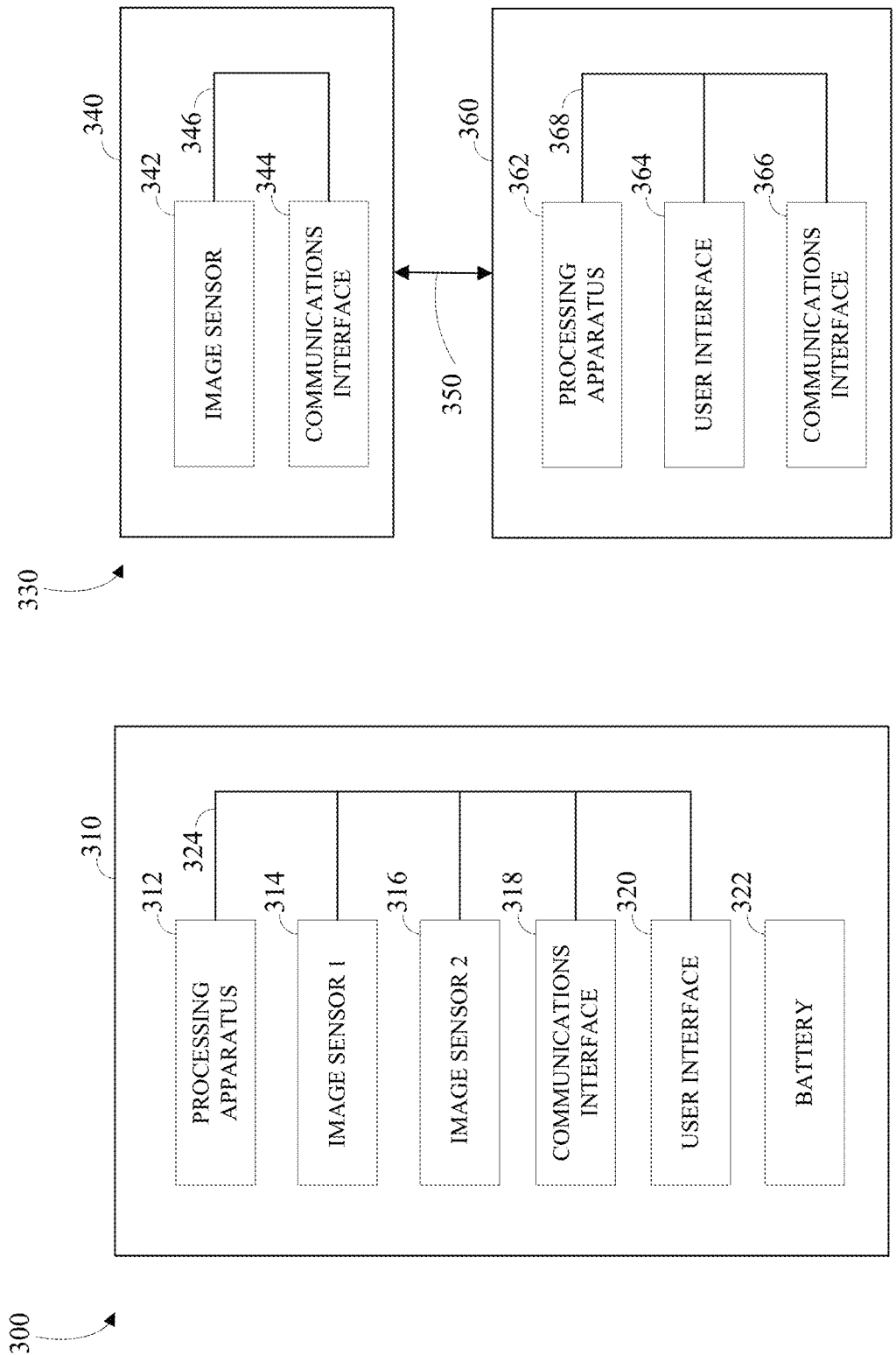

ANALYTIC TRIGGERS

CROSS-REFERENCE TO RELATED APPLICATION(S)

This application claims priority to and the benefit of U.S. Provisional Patent Application No. 62/732,792, filed Sep. 18, 2018, the entire disclosure of which is hereby incorporated by reference.

TECHNICAL FIELD

This disclosure relates to image capture systems, devices, and methods.

BACKGROUND

Image capture devices, such as cameras, may capture content as images or video. Users of image capture devices often find themselves overwhelmed with the amount of information they receive from the image capture devices during a first time use (FTU). Systems, methods, and devices are needed to progressively disclose information to the users as they use the image capture devices.

SUMMARY

Disclosed herein are implementations of analytics-based triggers for progressive notifications in image capture systems and devices. The progressive notifications may be used for first time use (FTU) user training on device functions and features.

In an aspect, an image capture device may include an image sensor, a processing apparatus, and a display. The image sensor may be configured to capture an image. The processing apparatus may be configured to obtain data. The processing apparatus may be configured to associate a function for each of the obtained data. The processing apparatus may be configured to store each associated function as analytic data. The analytic data may be stored in a memory. The processing apparatus may be configured to determine a notification based on the analytic data on a condition that the analytic trigger is greater than a function instance threshold. The display may be configured to display the notification.

In another aspect, an image capture device may include an image sensor, a processing apparatus, and a display. The image sensor may be configured to capture an image. The image may include image data. The processing apparatus may be configured to obtain data. The obtained data may include the image data. The processing apparatus may be configured to associate a function for each of the obtained data. The processing apparatus may be configured to store each associated function as analytic data. The analytic data may be stored in a memory. The processing apparatus may be configured to analyze the image data. The processing apparatus may be configured to determine a notification based on the analyzed image data. The display may be configured to display the notification.

In another aspect, an image capture device may include an image sensor configured to capture an image and processing apparatus. The processing apparatus may be configured to obtain data and associate a function for each of the obtained data. The processing apparatus may be configured to store each function instance as analytic data. The processing apparatus may determine an analytic trigger occurrence and determine if the analytic trigger occurrence is greater than a function instance threshold. The processing apparatus may be configured to display a notification based on the analytic data.

In another aspect, a method may include associating a function for an obtained data. The method may include storing an associated function for the obtained data as analytic data. The method may include determining an analytic trigger occurrence based on the analytic data. The method may include determining a notification based on the analytic data on a condition that the analytic trigger occurrence is greater than a threshold. The method may include displaying the notification.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems in accordance with implementations of this disclosure.

DETAILED DESCRIPTION

Figure 1A:
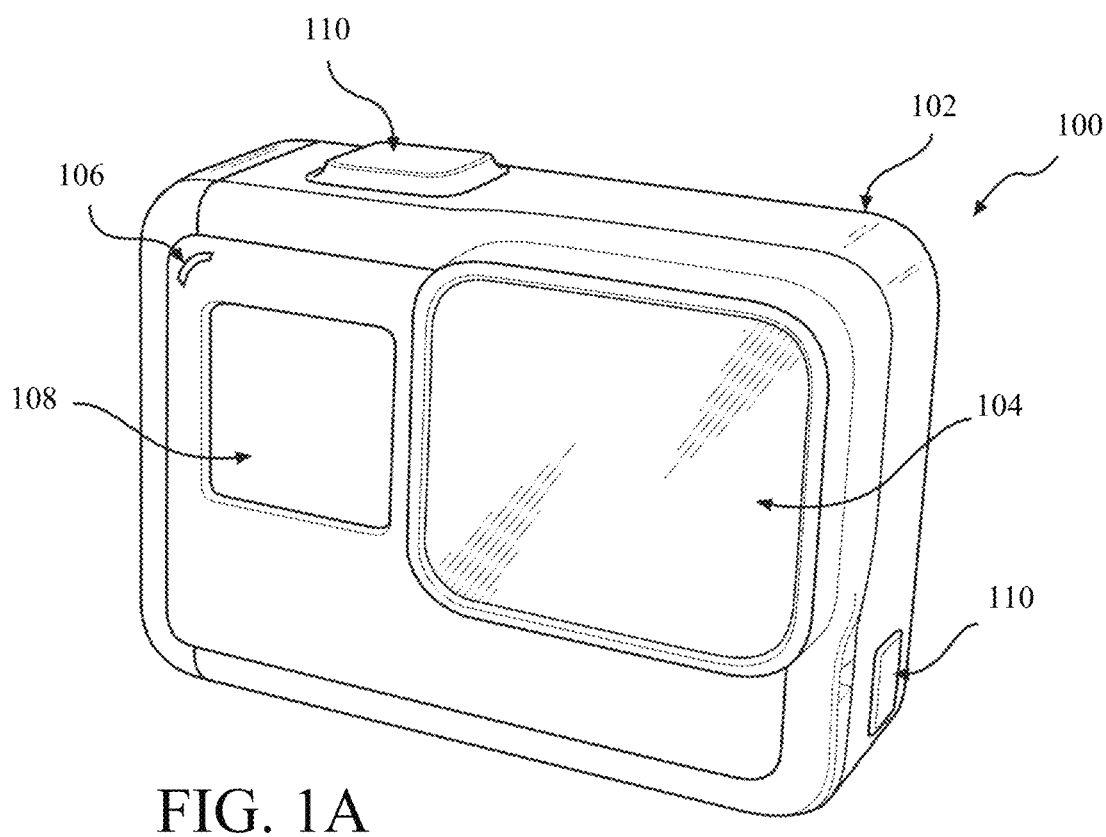
FIGS. 1A-D are isometric views of an example of an image capture device configured for image capture and progressive notifications based on device analytics.

Disclosed herein are implementations of progressive notifications in image capture systems and devices using analytics-based triggers. The implementations described herein may provide a user of an image capture device a tailored experience via notifications, such as tips, for their first time use. The notifications may be a "pop-up" window on a display of an image capture device. The notification may be interactive, such that it elicits a response from the user. The notification may include an audible sound, a light, a haptic alert, or any combination thereof.

Systems, methods, and devices disclosed herein may use contextual triggers, analytic triggers, or both. Contextual triggers may be used when the user desires to learn at their own pace. For example, the user is free to tap or select any feature, and notifications are displayed based on the feature that the user has selected. Analytic triggers are based on image capture data. For example, the image capture device is configured to obtain and store data regarding the number of media captures the user has taken, the duration of each media capture, the orientation of the image capture device, global positioning system (GPS) location, image data, the number of times a certain button has been pressed, the number of times a mode has been used, or any combination thereof.

The analytic triggers are used to analyze the image capture device data and create analytic data by associating the image capture device data with metrics related to a function of the image capture device. By applying the image capture device data that the user has produced, the image capture device may provide customized suggestions based on the behavior of the individual user.

In one example, the image capture device may be configured to provide progressive notifications. For example, after the user has performed five media captures, the image capture device may suggest a basic function, and after twenty-five media captures, the image capture device may suggest a more complex function. In some implementations, there may be a roadmap of suggestions and tips that are capped at 30 instances. For example, after every five media captures, the image capture device provides a suggestion, and the image capture device is configured to stop providing suggestions after 30 media captures for a particular function.

In another example, the image capture device may track the number of times a user uses a feature or a button. The feature or button may then be associated with a suggestion to produce analytic data. One or more notifications may be displayed based on the analytic data.

In another example, actual image data may be used to provide a suggestion. For example, if an object in an image is poorly framed, the image capture device may display a notification regarding centering the object or framing the object using the rule of thirds. If the lighting is poor, the image capture device may be configured to suggest another mode to improve image capture. In some implementations, image metadata may be used to provide a suggestion.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
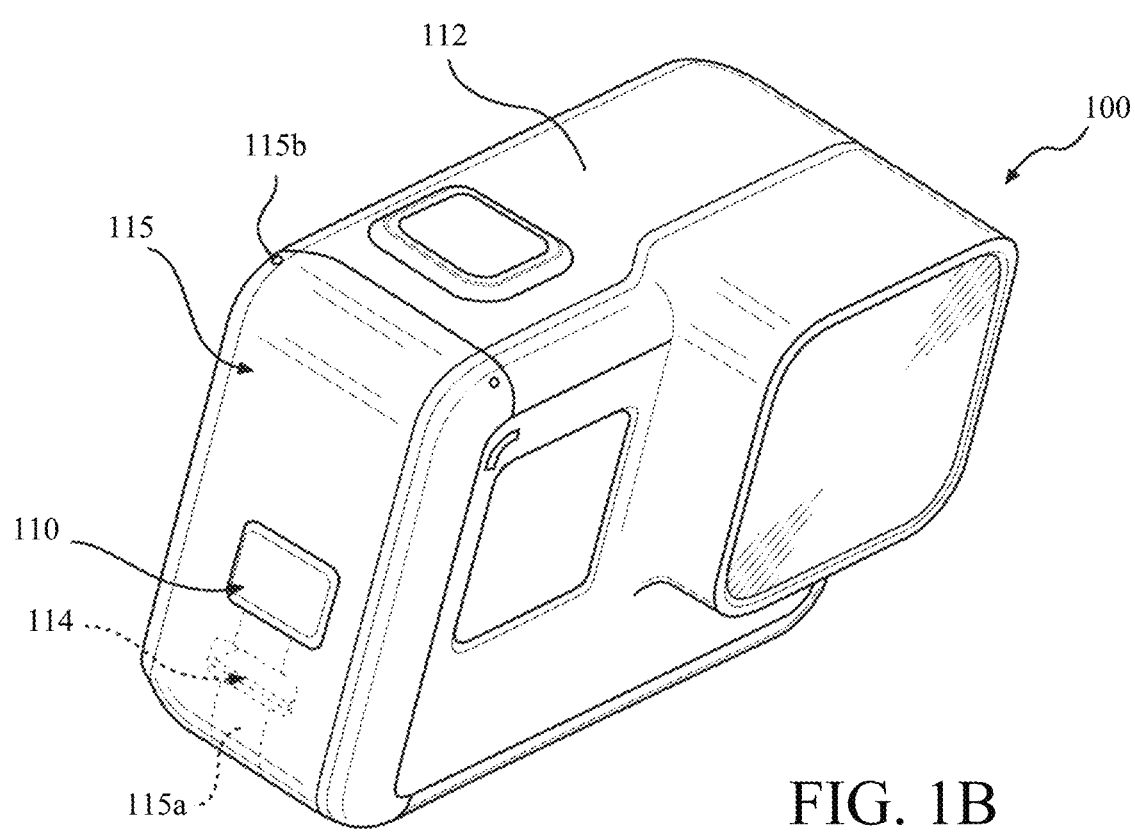
Figure 1C:
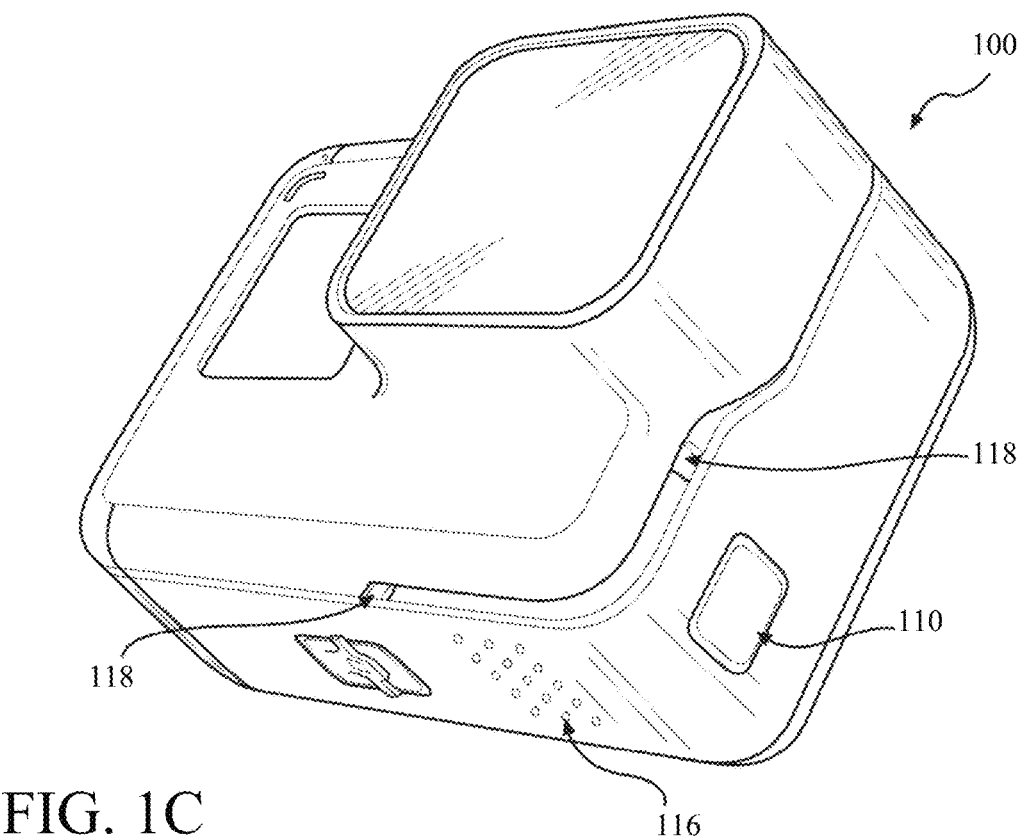
Figure 1D:
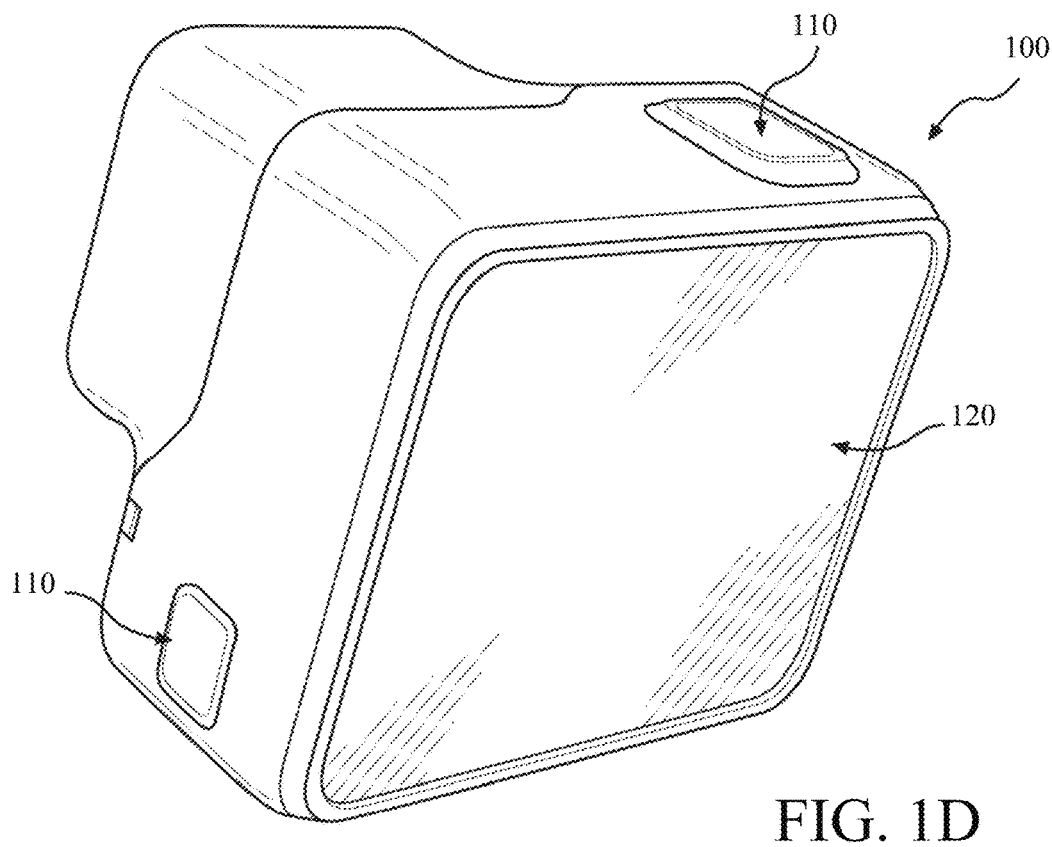

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used.

The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
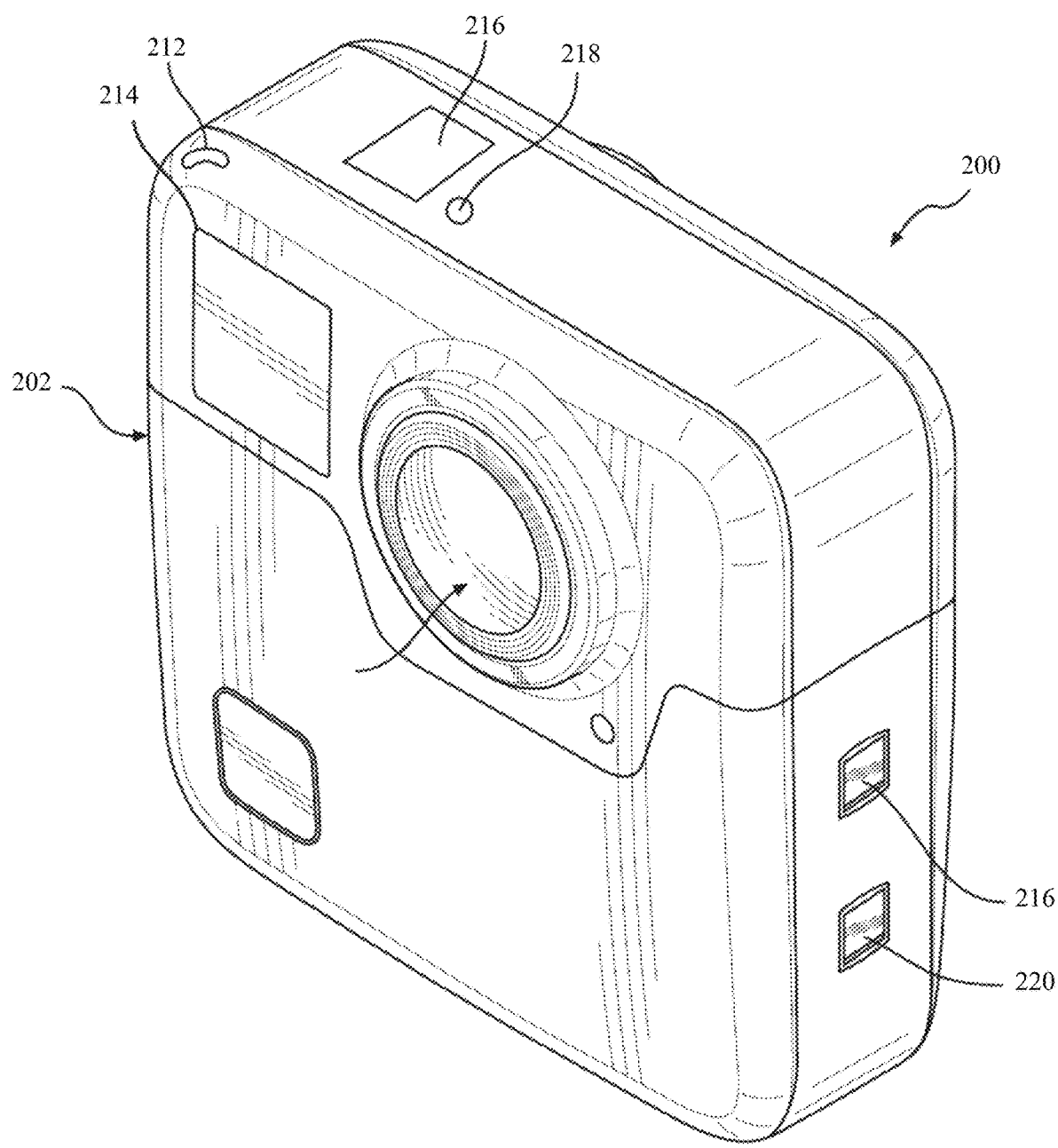
FIGS. 2A-B are isometric views of another example of an image capture device configured for image capture and progressive notifications based on device analytics.
Figure 2B:
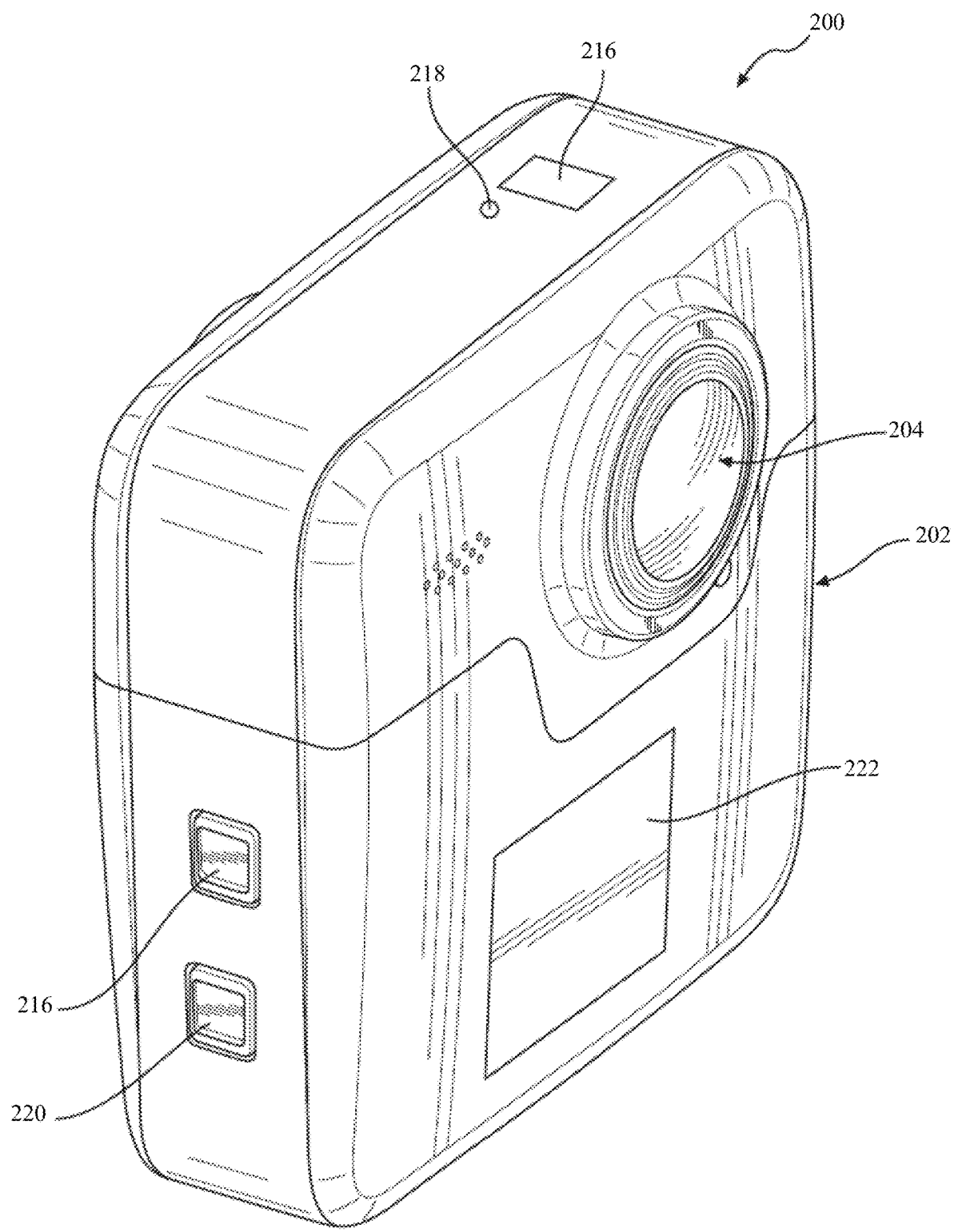

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
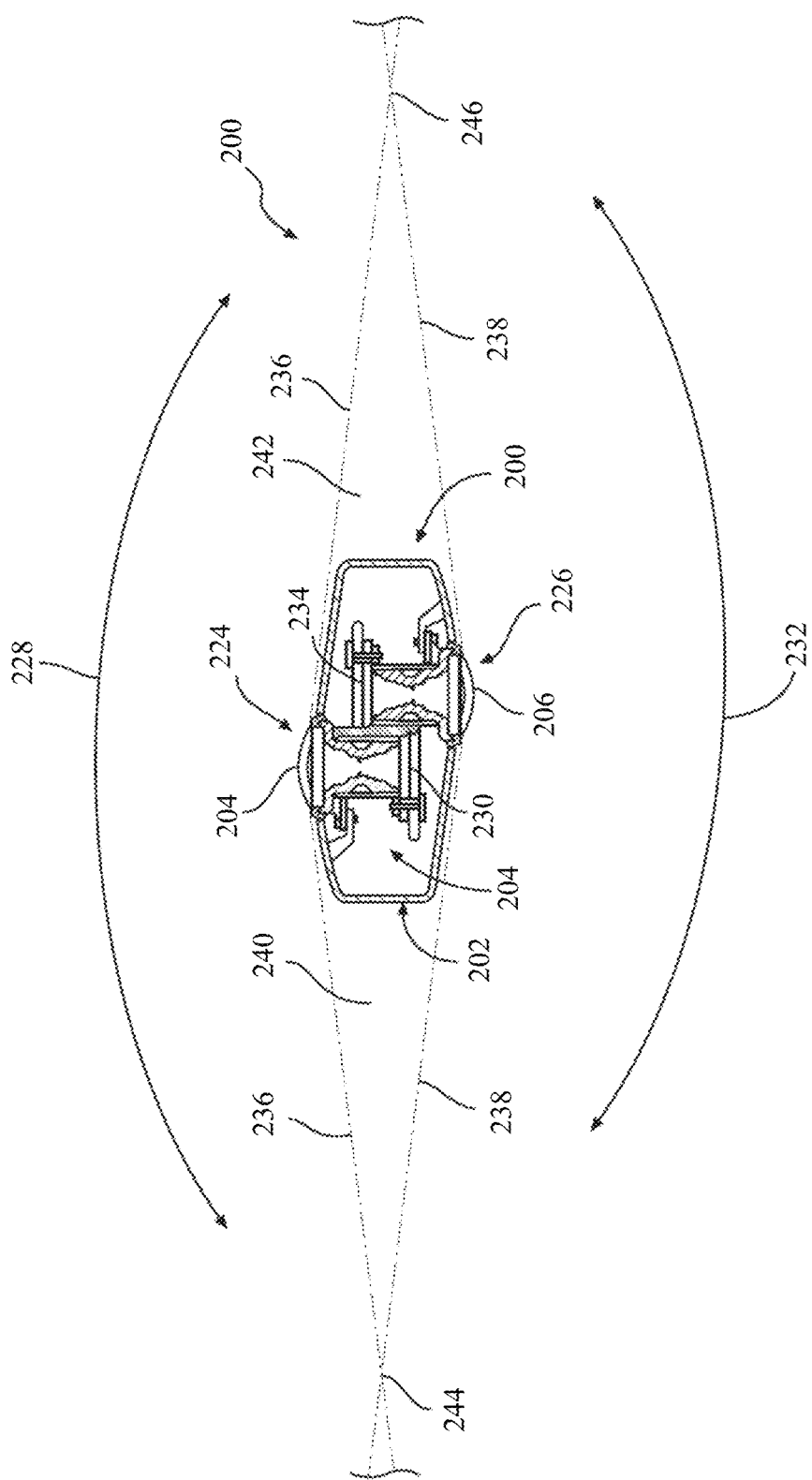
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 4:
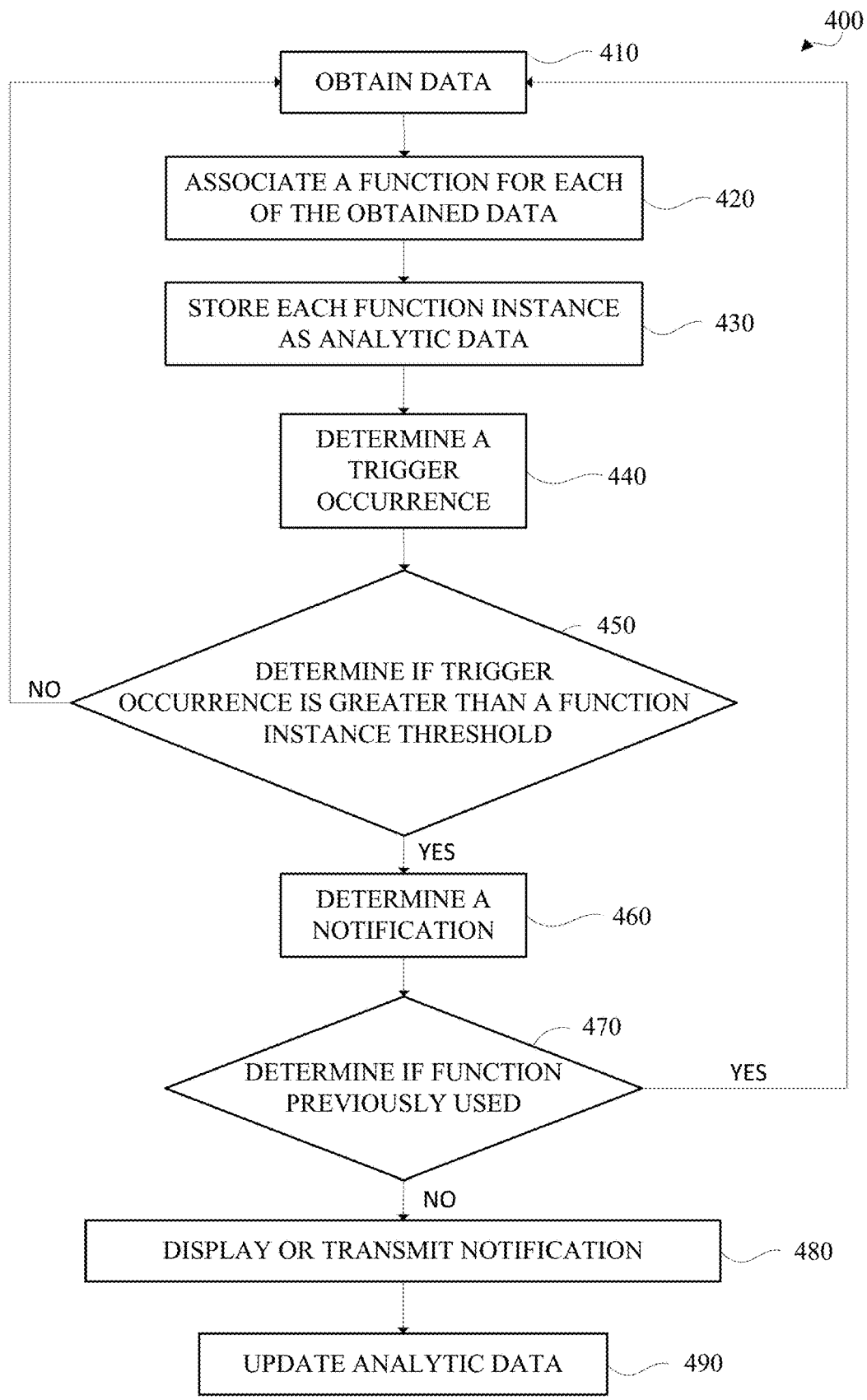
FIG. 4 is a flow diagram of an example of a method for displaying progressive notifications based on device analytics.

The image capture system 300 may be used to implement some or all of the techniques described in this disclosure, such as the technique 400 described in FIG. 4.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the technique 400 of FIG. 4.

FIG. 4 is a flow diagram of an example of a method 400 for displaying progressive notifications based on device analytics. The method 400 may be used to create an extending FTU experience for users using a system of messaging that is dependent on the image capture device analytics. The image capture device may display a notification based on a predetermined threshold, one or more variables that the image capture device tracks, or a combination thereof. This system of messaging may be used to teach users about increasingly complex features of the image capture device as the user becomes more oriented with the image capture device through continued use. Some non-limiting examples of analytic triggers include how many captures the user has taken, overall recorded time in a mode or all modes, first use of a feature, first entry into a screen, orientation of image capture device, GPS location, and accelerometer data.

Referring to FIG. 4, the image capture device obtains 410 data. The data may include sensor data (i.e., image data, GPS data, accelerometer data, temperature data, etc.), a number of captures the user has taken, a recorded time duration in a mode or all modes, a first use of a feature, a first entry into a screen, orientation of image capture device, or any other analytic data that can be collected on the image capture device. The method 400 includes associating 420 a function of the image capture device for each of the obtained data. Associating 420 a function of the image capture device may include creating a function instance for each of the obtained data. The method 400 includes storing 430 each function instance as analytic data. The analytic data may be stored in a memory on the image capture device, a memory on a mobile device, in a cloud-based network storage device, or any combination thereof.

The method 400 includes determining 440 an analytic trigger occurrence. For example, an analytic trigger may include how many captures the user has taken, overall recorded time in a mode or all modes, first use of a feature, first entry into a screen, orientation of image capture device, GPS location, and accelerometer data. The method 400 includes determining 450 if the trigger occurrence is greater than a function instance threshold. For example, a function threshold may be five (5) media captures. If a user takes a sixth media capture, where media capture is the trigger occurrence, the function instance threshold is exceeded, where five (5) media captures is the function instance threshold. Any number of events may be used as a threshold, and five (5) media captures are used here as an example. This example is not limited to a media capture event, and any event may be used.

On a condition that the trigger occurrence is greater than the function instance threshold, the image capture device determines 460 an appropriate notification based on the analytic data. If it is determined 470 that the function has not been previously used by the user, the image capture device will display or transmit 480 the notification. In some implementations, the method 400 includes updating the analytic data 490.

The method 400 may be implemented in an image capture device configured to provide progressive notifications. For example, after the user has performed five media captures, the image capture device may suggest a basic function, and after twenty-five media captures, the image capture device may suggest a more complex function. In some implementations, there may be a roadmap of suggestions and tips that are capped at 30 instances. For example, after every five media captures, the image capture device provides a suggestion, and the image capture device is configured to stop providing suggestions when a notification threshold has been met. In this example, the image capture device may stop providing suggestions after 30 media captures for a particular function. In some implementations, the notification threshold may be associated with a number of times a notification has been displayed. For example, a notification may be displayed the first five time a function is performed and cease displaying the notification thereafter.

In another example, the method 400 may be implemented in an image capture device that is configured to track the number of times a user uses a feature or a button. The feature or button may then be associated with a suggestion to produce analytic data. One or more notifications may be displayed based on the analytic data.

In another example, the method 400 may be implemented in an image capture device configured to analyze image data to provide a suggestion. For example, if an object in an image is poorly framed, the image capture device may display a notification regarding centering the object or framing the object using the rule of thirds. If the lighting is poor, the image capture device may be configured to suggest another mode to improve image capture. In some implementations, image metadata may be used to provide a suggestion.

Figure 5:
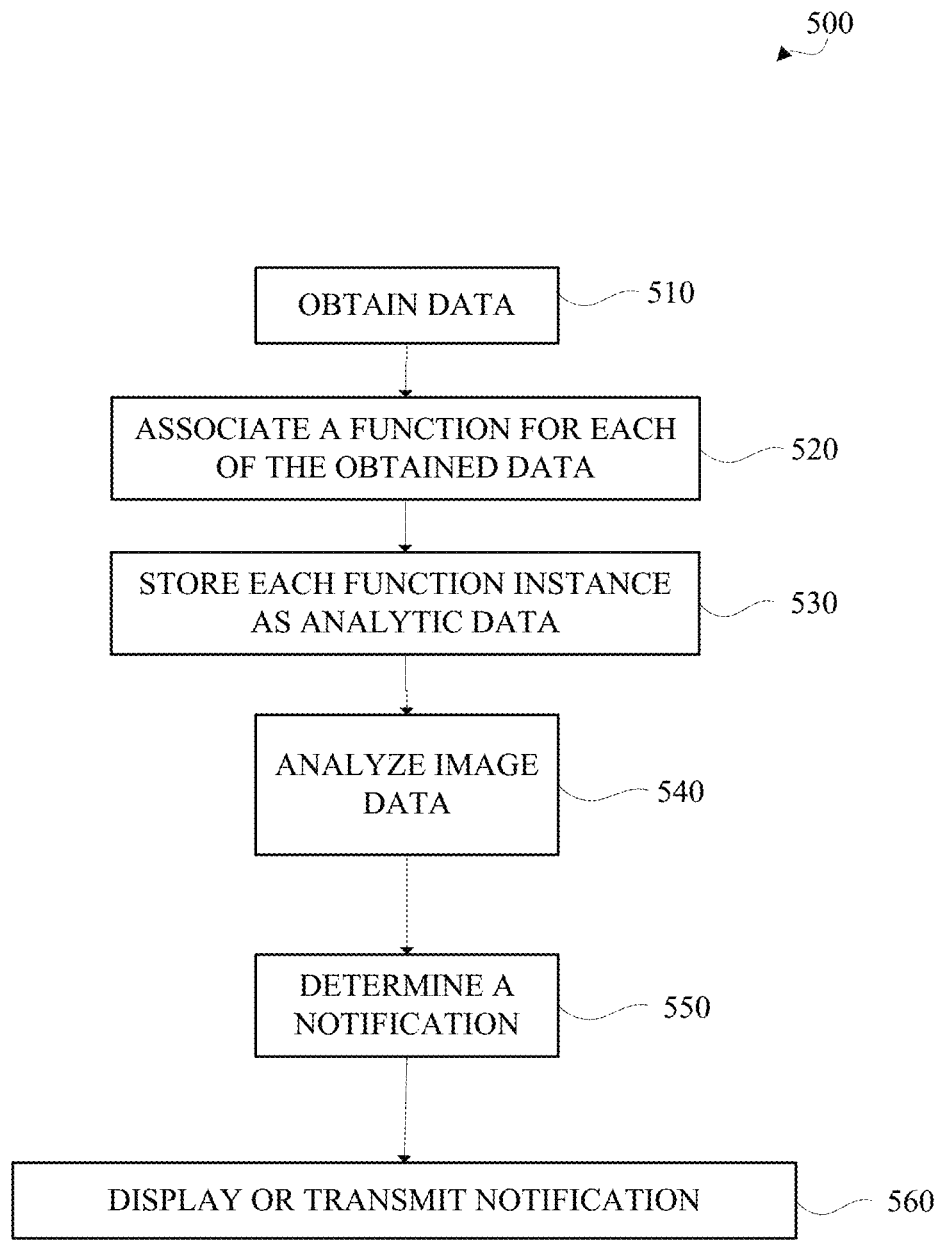
FIG. 5 is a flow diagram of an example of a method for displaying notifications based on image data.

FIG. 5 is a flow diagram of an example of a method 500 for displaying notifications based on image data. The method 500 may be used to create an extending FTU experience for users using a system of messaging that is dependent on the image capture device analytics. The image capture device may display a notification based on a predetermined threshold, one or more variables that the image capture device tracks, or a combination thereof. This system of messaging may be used to teach users about increasingly complex features of the image capture device as the user becomes more oriented with the image capture device through continued use. Some non-limiting examples of analytic triggers include how many captures the user has taken, overall recorded time in a mode or all modes, first use of a feature, first entry into a screen, orientation of image capture device, GPS location, and accelerometer data.

Referring to FIG. 5, the image capture device obtains 510 data. The data may include sensor data (i.e., image data, GPS data, accelerometer data, etc.), a number of captures the user has taken, a recorded time duration in a mode or all modes, a first use of a feature, a first entry into a screen, orientation of image capture device, or any other analytic data that can be collected on the image capture device. The method 500 includes associating 520 a function of the image capture device for each of the obtained data and storing 530 each function instance as analytic data. The analytic data may be stored in a memory on the image capture device, a memory on a mobile device, in a cloud-based network storage device, or any combination thereof.

The method 500 includes analyzing 540 image data and determining 550 a notification based on the image data. For example, if an object in an image is poorly framed, the image capture device may display 560 a notification regarding centering the object or framing the object using the rule of thirds. If the lighting is poor, the image capture device may be configured to suggest another mode to improve image capture. In some implementations, image metadata may be used to provide a suggestion. In some implementations, the analyzed image data may be used to update the analytic data.

Figure 6A:
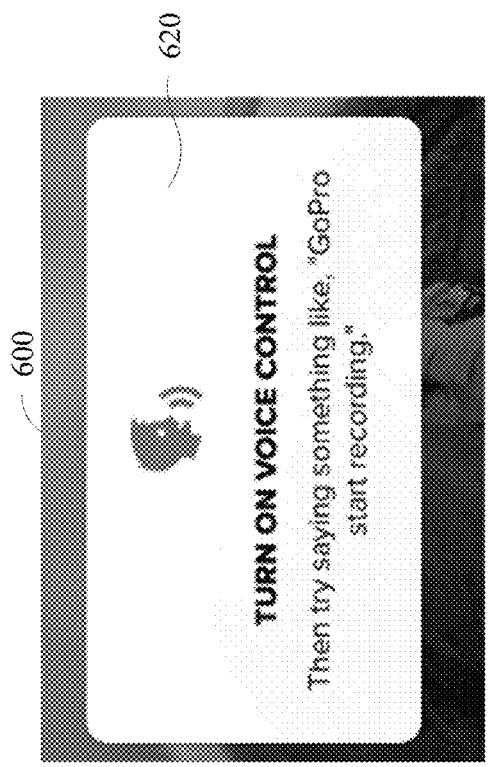
FIGS. 6A-I are diagrams of examples of a display configured to display a notification based on device analytics.

FIG. 6A is a diagram of an example of a display 600 configured to display a notification 610 based on device analytics. The display 600 may be any electronic display, for example, interactive display 120 of the image capture device 100 shown in FIG. 1D. In this example, the analytic data of the image capture device may suggest changing the orientation of the image capture device. For example, the portrait trigger may occur after the user has performed 10 media captures. A message instructing the user to switch to portrait mode may be displayed immediately after the shutter is pressed to stop encoding on the $10^{th}$ capture. If the image capture device starts encoding while in portrait orientation before the trigger occurs, the trigger may be disabled. In another example, the image capture device may detect that the user is attempting to capture a portrait and suggest orienting the image capture device in a portrait orientation.

Figure 6B:
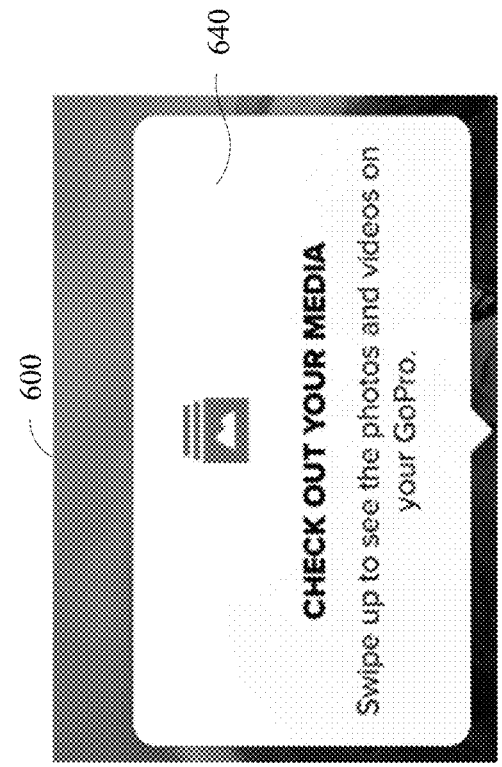

FIG. 6B is a diagram of another example of a display 600 configured to display a notification 620 based on device analytics. The display 600 may be any electronic display, for example, interactive display 120 of the image capture device 100 shown in FIG. 1D. In this example, the analytic data of the image capture device may suggest turning on voice control. The voice control trigger may occur after the user has performed 20 media captures. A message instructing the user to turn on voice control may be displayed immediately after the shutter is pressed to stop encoding on the 20$^{th}$ capture. If the user has attempted a voice command before the voice control trigger occurs, the voice control trigger may be disabled. In another example, the image capture device may detect a situation where hands-free operation of the image capture device is optimal and suggest turning on voice control.

Figure 6C:
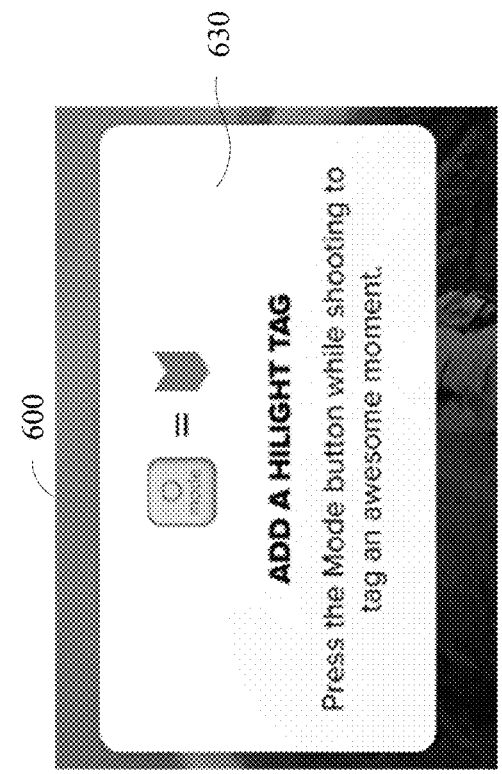

FIG. 6C is a diagram of another example of a display 600 configured to display a notification 630 based on device analytics. The display 600 may be any electronic display, for example, interactive display 120 of the image capture device 100 shown in FIG. 1D. In this example, the image capture device may determine that the user has attempted a minimum threshold of media captures, or any other threshold, in order to be comfortable enough to be introduced to a highlight feature. In one example, the highlight trigger occurs after the user has performed 25 media captures. A message instructing the user to add a highlight tag may be displayed immediately after the shutter is pressed to stop encoding on the 25$^{th}$ capture.

Figure 6D:
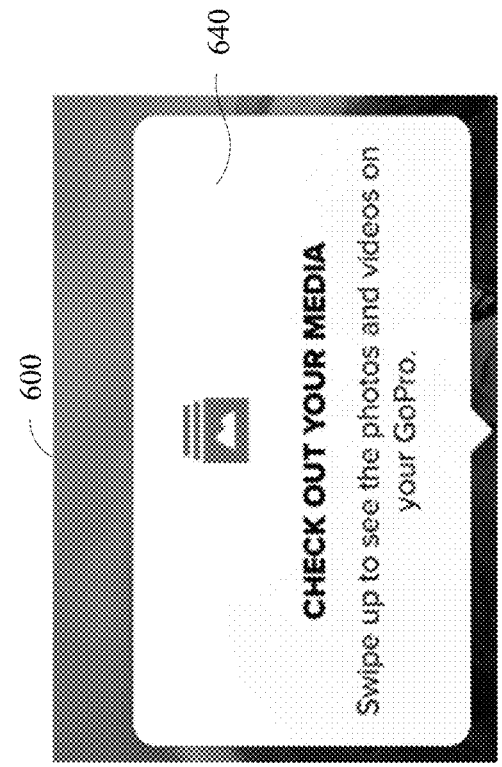

FIG. 6D is a diagram of another example of a display 600 configured to display a notification 640 based on device analytics. The display 600 may be any electronic display, for example, interactive display 120 of the image capture device 100 shown in FIG. 1D. In this example, the image capture device may determine that the user has attempted a minimum threshold of media captures, or any other threshold, in order to be comfortable enough to be introduced to a media recall feature. For example, the gallery trigger may occur after the user has performed one media capture. A message instructing the user to view the media gallery may be displayed immediately after the first media capture is performed.

Figure 6E:
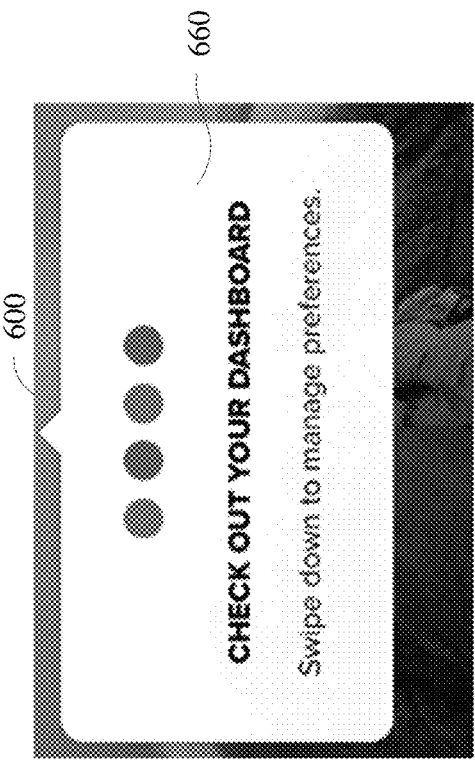

FIG. 6E is a diagram of another example of a display 600 configured to display a notification 650 based on device analytics. The display 600 may be any electronic display, for example, interactive display 120 of the image capture device 100 shown in FIG. 1D. In this example, the image capture device may determine that the user has attempted a minimum threshold of media captures, or any other threshold, in order to be comfortable enough to be introduced to a GPS feature. Alternatively, or in addition, the image capture device may detect a situation where a GPS function would be desirable for the user. The GPS trigger may occur after the user has performed 25 media captures. A message instructing the user to turn on the GPS feature may be displayed immediately after the shutter is pressed to stop encoding on the 25$^{th}$ capture.

Figure 6F:
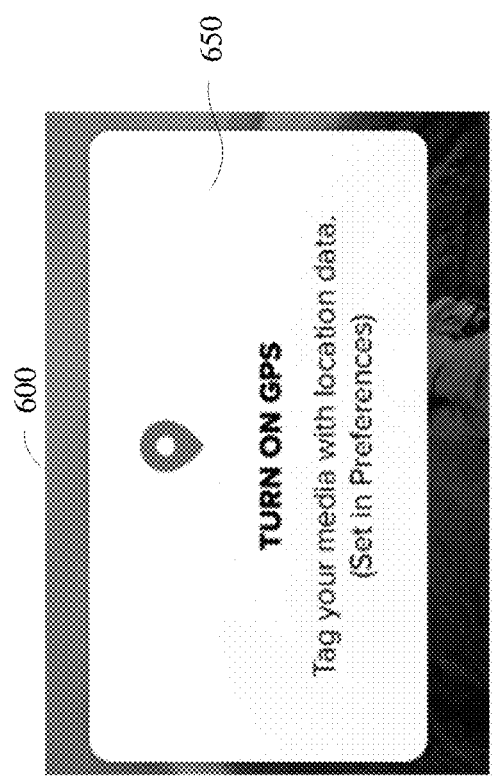

FIG. 6F is a diagram of another example of a display 600 configured to display a notification 660 based on device analytics. The display 600 may be any electronic display, for example, interactive display 120 of the image capture device 100 shown in FIG. 1D. In this example, the image capture device may determine that the user has attempted a minimum threshold of media captures, or any other threshold, in order to be comfortable enough to be introduced to a dashboard feature. The dashboard trigger may occur after the user has performed 3 media captures. A message instructing the user to view the dashboard may be displayed immediately after the shutter is pressed to stop encoding on the 3$^{rd}$ capture.

Figure 6G:
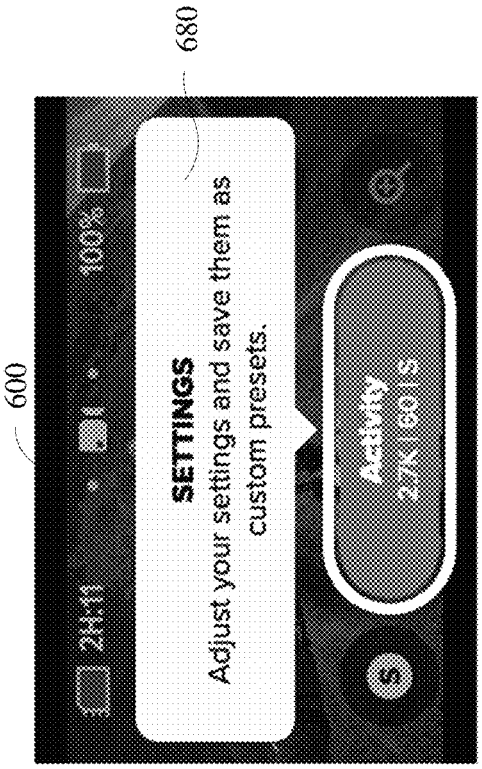

FIG. 6G is a diagram of another example of a display 600 configured to display a notification 670 based on device analytics. The display 600 may be any electronic display, for example, interactive display 120 of the image capture device 100 shown in FIG. 1D. In this example, the image capture device may determine that the user has attempted a minimum threshold of media captures, or any other threshold, in order to backup the media captures to the cloud. The cloud trigger may occur after the user has performed 30 media captures. A message instructing the user to upload their media to the cloud may be displayed immediately after the 30$^{th}$ capture.

Figure 6H:
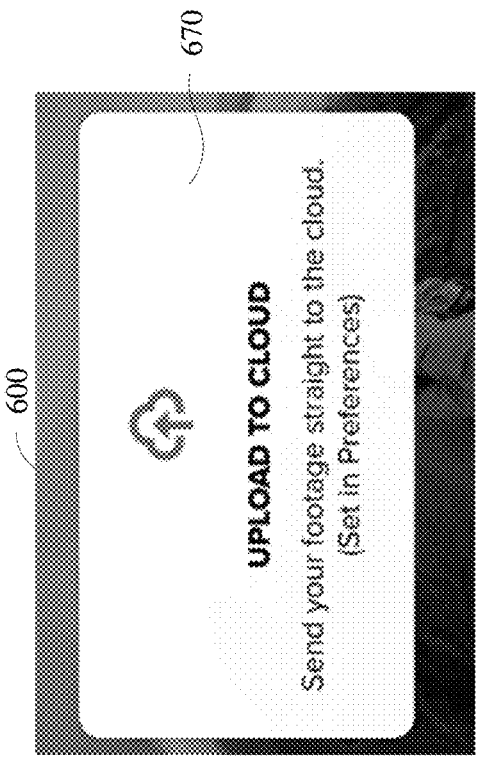

FIG. 6H is a diagram of another example of a display 600 configured to display a notification 680 based on device analytics. The display 600 may be any electronic display, for example, interactive display 120 of the image capture device 100 shown in FIG. 1D. In this example, the image capture device may determine that a user has engaged with a button for the first time and display an action-based notification. For example, on the first instance of a user activating the activity button, the image capture device may trigger a notification to direct the user to the settings menu to customize one or more settings based on the activity.

Figure 6I:
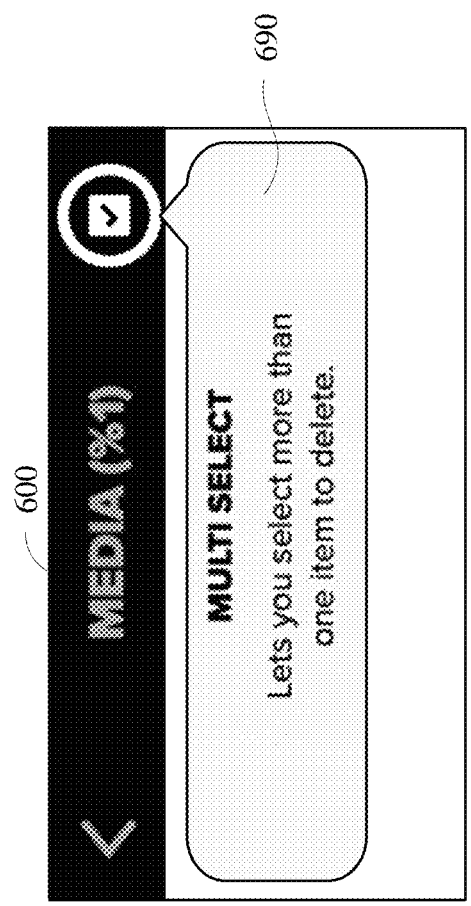

FIG. 6I is a diagram of another example of a display 600 configured to display a notification 690 based on device analytics. The display 600 may be any electronic display, for example, interactive display 120 of the image capture device 100 shown in FIG. 1D. In this example, the image capture device may determine that a user has entered a new area of the UI for the first time and display an entry-based notification. For example, on the first instance of a user activating the image select button, the image capture device may trigger a notification to notify the user that multiple images may be selected.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
an image sensor configured to capture an image; and
a processing apparatus configured to:
  obtain data;
  associate a function for each of the obtained data;
  store each associated function as analytic data;
  determine an analytic trigger occurrence based on the analytic data; and
  on a condition that the analytic trigger occurrence is greater than a function instance threshold, determine a notification based on the analytic data; and
a display configured to display the notification.

2. The image capture device of claim 1, wherein the processing apparatus is further configured to update the analytic data.

3. The image capture device of claim 1, wherein the obtained data includes global positioning system (GPS) data, accelerometer data, or temperature data.

4. The image capture device of claim 1, wherein the display is configured to display the notification on a condition that the function was not previously used.

5. The image capture device of claim 1, wherein the processing apparatus is further configured to stop providing notifications on a condition that a notification threshold has been met.

6. The image capture device of claim 5, wherein the notification threshold is based on a number of times the notification has been displayed.

7. The image capture device of claim 1, wherein the analytic trigger is based on how many captures a user has taken, a recorded time in a mode, a recorded time in all modes, a first use of a feature, a first entry into a screen, an orientation of image capture device, a global positioning system (GPS) location, or accelerometer data.

8. The image capture device of claim 1, wherein the function instance threshold is five instances.

9. An image capture device comprising:
an image sensor configured to capture an image that comprises image data; and
a processing apparatus configured to:
  obtain data, wherein the data includes the image data;
  associate a function for each of the obtained data;

store each associated function as analytic data;
analyze the image data; and
determine a notification based on the analyzed image data; and
a display configured to display the notification.

10. The image capture device of claim 9, wherein the processing apparatus is further configured to update the analytic data.

11. The image capture device of claim 9, wherein the obtained data includes global positioning system (GPS) data, accelerometer data, or temperature data.

12. The image capture device of claim 9, wherein the processing apparatus is further configured to stop providing notifications on a condition that a notification threshold has been met.

13. The image capture device of claim 12, wherein the notification threshold is based on a number of times the notification has been displayed.

14. The image capture device of claim 9, wherein the analytic trigger is based on how many captures a user has taken, a recorded time in a mode, a recorded time in all modes, a first use of a feature, a first entry into a screen, an orientation of image capture device, a global positioning system (GPS) location, or accelerometer data.

15. The image capture device of claim 9, wherein the function instance threshold is five instances.

16. A method comprising:
associating a function for an obtained data;
storing an associated function for the obtained data as analytic data;
determining an analytic trigger occurrence based on the analytic data;
on a condition that the analytic trigger occurrence is greater than a function instance threshold, determining a notification based on the analytic data; and
displaying the notification.

17. The method of claim 16 further comprising:
updating the analytic data.

18. The method of claim 16, wherein the obtained data includes global positioning system (GPS) data, accelerometer data, or temperature data.

19. The method of claim 16, wherein displaying the notification continues until a notification threshold has been met.

20. The method of claim 19, wherein the notification threshold is based on a number of times the notification has been displayed.

* * * * *